Nov. 16, 1965 T. MOLLINGA 3,218,444
SIGNAL CONVERTER
Filed March 29, 1962
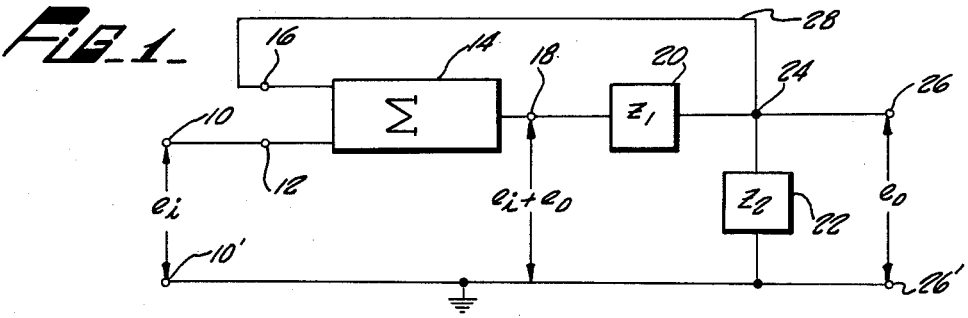
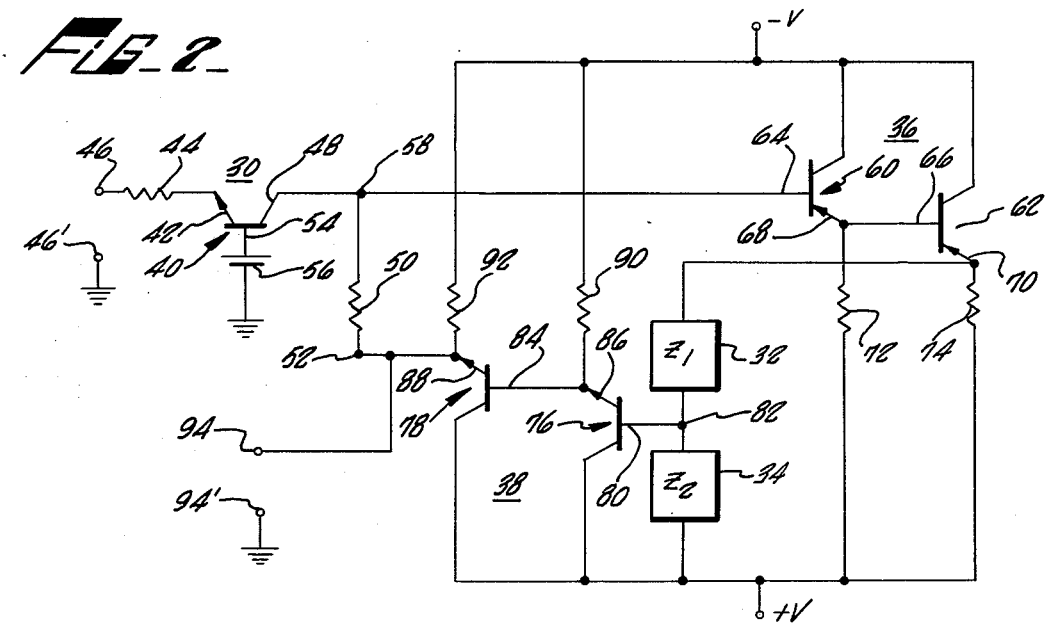
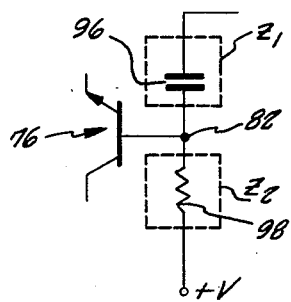
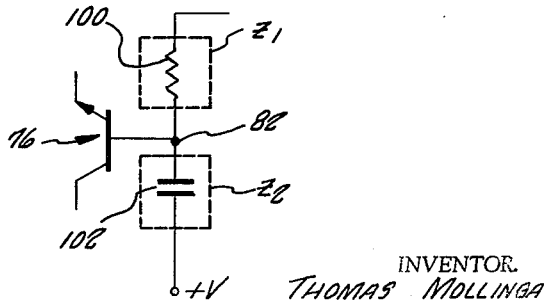
INVENTOR.
THOMAS MOLLINGA
BY
Christie, Parker & Hale
ATTORNEYS.

United States Patent Office 3,218,444
Patented Nov. 16, 1965

3,218,444
SIGNAL CONVERTER
Thomas Mollinga, Sierre Madre, Calif., assignor to Burroughs Corporation, Detroit, Mich., a corporation of Michigan
Filed Mar. 29, 1962, Ser. No. 183,657
6 Claims. (Cl. 235—183)

This invention is directed to improvements in apparatus for electronically performing mathematical operations and, more particularly, to a novel and simple signal converter circuit design for electrically integrating or differentiating electrical signals applied thereto with a high degree of accuracy.

In various electronic systems, and particularly in electronic analog computers, it is necessary to electronically perform the mathematical operations of differentiation and integration. The simplest circuit for performing such mathematical operations is the resistor-capacitor series circuit. To develop an output voltage signal representative of the differential of an input voltage signal, the input signal is applied to the terminals of the series circuit and the output voltage taken across the resistor, while to develop an output voltage signal representative of the integral of the input voltage, the output voltage is taken across the capacitor.

Although the resistor-capacitor circuit is simple and inexpensive, the output voltage signal developed thereby is only an approximation of the mathematical differential or integral of the input voltage signal. Thus, the basic resistor-capacitor circuit has found only limited use as an integrator or differentiator in electronic systems requiring extreme accuracy in performing mathematical operations. Instead, more elaborate and expensive circuitry incorporating operational amplifiers are generally employed to electronically perform mathematical operations.

Circuitry employing operational amplifiers, however, in addition to being relatively expensive, require that the amplifier possess a high gain. The use of a high gain amplifier presents problems of possible oscillations in the circuit as well as the requirement of special circuit designs to maintain linear operation and temperature stability of the amplifier.

In view of the above, the present invention provides a novel signal converter circuit design which is simple and inexpensive and which electronically differentiates or integrates input voltage signals with extreme accuracy. In addition, the circuit design does not require any signal gain and is highly linear in its operation over a wide frequency range.

To accomplish this the present invention contemplates a novel modification of the basic resistor-capacitor series circuit. In particular, it has been discovered that by adding the output voltage signal developed by the resistor-capacitor circuit to the input voltage signal applied thereto, the output voltage signal becomes a true representation of the differential or integral of the input voltage signal depending upon whether the output is taken from the resistor or the capacitor.

Thus, the basic form of the present invention includes a summing network having first and second input terminals and an output terminal. First and second impedance elements are coupled in series and to the output terminal of the summing network and a constant voltage source, respectively. The impedance elements comprise a resistor and a capacitor. Output means are coupled to a junction of the first and second impedance elements for detecting an output voltage developed across the second impedance element in response to an input voltage signal applied to the first input terminal of the summing network. Means are provided for applying the output voltage to the second input terminal of the summing network such that a voltage is developed at the output of the summing network equal to a sum of the input voltage signal and the output voltage signal.

The specific arrangement of the resistor and the capacitor is determined by whether it is desired to differentiate or integrate the input voltage signal. Thus, if it is desired to differentiate the input voltage signal the capacitor is coupled to the output terminal of the summing network and the resistor to the constant voltage source, while for integration of the input voltage signal the resistor is coupled to the output of the summing network and the capacitor to the constant voltage source. In either arrangement, due to the addition of the output voltage to the input voltage at the summing network, an output voltage is developed at the output means which is a true representation of either the differential or integral of the input voltage signal.

The above, as well as other features of the present invention, may be more clearly understood by reference to the following detailed description when taken with the drawings, in which:

FIGURE 1 is a schematic, block diagram representation of the basic form of the present invention;

FIGURE 2 is a schematic representation of a preferred circuit arrangement of the signal converter of the present invention;

FIGURE 2A illustrates an arrangement of the impedance elements for differentiating an input voltage signal; and FIGURE 2B represents an arrangement of the impedance elements for integrating an input voltage signal.

As represented in FIGURE 1, the basic form of the present invention includes a pair of input terminals 10 and 10' for receiving an alterating current input voltage $e_i$. The input terminal 10' is coupled to a constant voltage reference source represented as ground while the input terminal 10 is coupled to a first input terminal 12 of a summing network 14.

The summing network 14 includes a second input terminal 16 and an output terminal 18. Coupled to the output terminal 18 is a first impedance element 20 denoted as $Z_1$. Coupled between the impedance element 20 and the constant voltage source is a second impedance element 22 denoted as $Z_2$. Coupled to a junction 24 of the impedance elements 20 and 22 is an output terminal 26 comprising one of the pair of output terminals 26 and 26'. The output terminal 26' is coupled to the constant voltage source ground.

In response to an input voltage signal $e_1$ applied between the input terminals 10 and 10' an output voltage signal $e_o$ is developed between the output terminals 26 and 26'. The output voltage represents either the differential or integral of the input voltage signal depending upon the electrical components comprising the first and second impedance elements 20 and 22. For example, if the impedance element 20 is a capacitor and the impedance element 22 a resistor, the output voltage represents a differential of the input voltage while if the impedance element 20 is a resistor and the impedance element 22 a capacitor, the output voltage represents an integral of the input voltage.

As previously described, the output voltage developed from a series resistor-capacitor circuit by itself is only an approximation of the differential or integral of the input voltage signal. In order that the output voltage shall be an exact representation of the differential or integral of the input voltage signal, the output voltage is coupled by a lead 28 to the second input terminal 16 of the summing network 14. Thus, between the output terminal 18 and ground, a voltage signal is developed which is equal to a sum of the input voltage and the output voltage as indicated. This, it has been found, results in an output voltage signal which is a true representation of the differential or integral of the input voltage applied between the input terminals 10 and 10'.

That such a result does occur may be seen from the following simplified circuit analysis. Considering the basic resistor-capacitor series circuit including the impedance elements $Z_1$ and $Z_2$ in which the voltage across the impedance $Z_1$ is equal to $e_2$, the circuit equation for the currents at the junction 24 becomes:

$$\frac{e_2}{Z_1} = \frac{e_o}{Z_2} \quad (1)$$

while, $$e_1 = e_2 + e_o \quad (2)$$

From the above expressions, $$Z_2 e_1 = Z_1 e_o + Z_2 e_o \quad (3)$$

If $Z_1$ is a capacitor C and $Z_2$ a resistor R, as in the case of a signal differentiator, Equation 3 becomes, $$e_i R = \frac{1}{C} \int e_o dt + e_o R \quad (4)$$

or $$e_o = RC e_1' - RC e_o' \quad (5)$$

Where $e_i'$ and $e_o'$ are the differentials of $e_i$ and $e_o$ respectively.

Thus, in the basic resistor-capacitor series circuit the output voltage is only an approximate representation of the differential of the input voltage signal.

In the present invention, however, the output voltage, $e_o$, is fed back to the input terminal 16 of the summing network 14. Accordingly, the voltage at the output terminal 18 of the summing network 14 becomes $e_1 + e_o$. The sum voltage is applied to the terminals of the series circuit i.e., between the terminal 18 and ground, to modify Equation 5 as follows:

$$e_o = RC e_1 + RC e_o' - RC e_o' \quad (6)$$

or $$e_o = RC e_1' \quad (7)$$

Thus by feeding back the output voltage to the summing network 14 the magnitude of the output voltage becomes the true differential of the input voltage signal.

A similar circuit analysis holds when $Z_1$ is a resistor R and $Z_2$ a capacitor C to form an integrator circuit. The result of such a circuit analysis is:

$$e_o = \frac{1}{RC} \int e_i dt \quad (8)$$

Accordingly, depending upon the arrangement of the resistor in series with the capacitor, the output voltage is either the true integral or differential of the input voltage signal.

A preferred circuit arrangement for effectuating the basic circuit design of the present invention is illustrated in FIGURE 2. Basically the preferred embodiment includes a summing network 30, first and second impedance elements 32 and 34 coupled in series and to an output terminal of the summing network and a constant voltage source, respectively, and a pair of buffer networks 36 and 38. The buffer networks function to prevent changes in impedance at the summing network 30 from affecting the output voltage developed at the impedance elements and to prevent changes in the value of the impedance elements 32 and 34 from affecting the operation of the summing network.

The summing network 30 preferably comprises a transistor 40 arranged in a grounded base configuration. The transistor 40 includes an emitter terminal 42 coupled through a resistor 44 to an input terminal 46 of a pair of input terminals 46 and 46', and a collector terminal 48 coupled through a resistor 50 to a second input terminal 52 for the summing network. The base terminal 54 of the transistor 40 is coupled through a battery 56 to ground. The battery 56 effects a positive biasing of the base terminal 54 relative to the emitter terminal 42 to maintain the transistor 40 in a normally conductive state.

Preferably, the transistor 40 is characterized by a current amplification $\beta$ which is much greater than unity, the resistors 44 and 50 are of equal value, and the impedance coupled to the junction 58 of the collector terminal 48 and the resistor 50 possesses a resistive value substantially greater than the value of the resistor 50. Under these conditions a voltage signal is developed at the junction 58 which is equal to an alternating current sum of the input voltage signals applied to the input terminals 46 and 52. In this manner the junction 58 functions as the output terminal for the summing network 30.

As illustrated, the output terminal 58 of the summing network 30 is coupled to the buffer network 36. The buffer network 36 is an impedance transforming device having a high input impedance and a low output impedance. The input of the buffer network 36 is coupled to the output terminal 58 while the output of the buffer network 36 is coupled to the impedance element 32. Since a high impedance is coupled to the output terminal 58 changes in the value of the impedance elements 32 and 34 with the frequency of electrical signals applied thereto have a minimal effect on the sum voltage developed by the summing network. Similarly, the output voltage developed at the impedance elements 32 and 34 is effectively isolated from impedance variations at the output of the summing network 30. Further, since the buffer network 36 possesses a high input impedance, the aforementioned requirement that a large resistive load be coupled to the junction 58 is satisfied.

Preferably, to provide such a buffering action, the buffer network 36 includes a pair of PNP type transistors 60 and 62 connected in series between the output terminal 58 and the impedance element 32. The transistors 60 and 62 are both arranged in an emitter follower configuration with the base terminal 64 of the transistor 60 being coupled to the output terminal 58 and the base terminal 66 of the transistor 62 being coupled to the emitter terminal 68 of the transistor 60. The emitter terminals 68 and 70 are coupled by biasing resistors 72 and 74, respectively, to the source of positive potential $+V$ while the collector terminals of the transistors 60 and 62 are coupled to a source of negative potential $-V$. In this manner the transistors 60 and 62 are biased to a normally conductive state. Since the transistors 60 and 62 are arranged in emitter follower configurations, the buffer network 36 possesses the aforementioned high input impedance and low output impedance to effect a minimal loading of the impedance elements 32 and 34 on the summing network 30.

As described, the buffer network 36 is coupled in series between the output terminal 58 and the impedance element 32. To effectuate such a coupling the emitter 70 of the transistor 62 is connected to the impedance element 32. Further, as illustrated, the second impedance element 34 is coupled in series with the first impedance element and to the source of positive potential $+V$. In this manner, the impedance elements 32 and 34 are arranged in a series circuit between the output terminal of the summing network and a constant voltage source.

To couple the output voltage developed at the impedance elements 32 and 34 to the second input terminal 52 of the summing network 30, as well as to effectively isolate the impedance elements from the second input to the summing network, the preferred embodiment of the signal converter utilizes the buffer network 38. The buffer network 38 is an impedance transforming device having a high input impedance and a low output impedance. The input of the buffer network 38 is coupled to the impedance element 34 and the output of the buffer network to the second input terminal 52. In this manner the output voltage developed at the impedance elements 32 and 34 is effectively isolated from impedance variations at the second input of the summing network and variations in the value of the impedance elements have a minimal effect on the operation of the summing network. The output voltage developed at the impedance elements 32 and 34 is thus applied directly through the buffer network 38 to the input terminal 52 to add, on a continuous basis, with the voltage applied to the input terminal 46 in accordance with the present invention.

To effectuate such a buffering operation the buffer network 38 preferably includes a pair of NPN type transistors 76 and 78. The transistors 76 and 78 are thus of a complementary type relative to the transistors comprising the buffer network 36 and provide self-compensation in the overall circuit, for the emitter-to-base voltage drops in the buffer networks as well as for changes in transistor characteristics with temperature. The transistors 76 and 78 are arranged in emitter follower configurations with the base terminal 80 of the transistor 76 being coupled to a junction 82 of the impedance elements 32 and 34 and the base terminal 84 of the transistor 78 being coupled to the emitter terminal 86 of the transistor 76. The emitter terminals 86 and 88 of the transistors 76 and 78 are coupled by resistors 90 and 92, respectively, to the source of negative potential $-V$, while the collector terminals of the transistors 76 and 78 are coupled to the source of positive potential $+V$. In this manner the transistors 76 and 78 are biased to a normally conductive state. The emitter terminal 88 is also connected to the input terminal 52 of the summing network 30 to complete the circuit connection between the impedance elements 32 and 34 and the summing network 30.

Since the transistors 76 and 78 are arranged in emitter follower configurations, the buffer network 38 possesses the aforementioned high input impedance at the base terminal 80 of the transistor 76 and the low output impedance at the emitter terminal 88 of the transistor 78 to effect a minimal loading of the summing network 30 on the impedance elements 32 and 34.

In addition to effectively isolating the impedance elements 32 and 34 and the summing network 30, the buffer network 38 also provides a buffering operation between the impedance elements and a pair of output terminals 94 and 94'. The output terminal 94 is connected to the emitter terminal 88 of the transistor 78 while the terminal 94' is connected to ground. Since the emitter follower configurations of the transistors 76 and 78 effect only an impedance transformation, the alternating current output voltage developed at the impedance elements 32 and 34 across the impedance element 34 is coupled directly through the buffer network 38 to the output terminals 94 and 94' without being loaded by metering or signal detecting devices which may be coupled to the output terminals.

Depending upon the particular circuit arrangement of the impedance elements 32 and 34 the output voltage developed at the output terminals 94 and 94' is either a true representation of the differential or integral of the input voltage applied to the input terminals 46 and 46'. For example, if the impedance element $Z_1$ is a capacitor 96, as represented in FIGURE 2A, and the impedance element $Z_2$ is a resistor 98, the output voltage is the differential of the input voltage signal, while if the impedance element $Z_1$ is a resistor 100, as represented in FIGURE 2B, and the impedance element $Z_2$ is a capacitor 102, the output voltage is an integral of the input voltage signal.

Considering briefly the overall operation of the preferred embodiment illustrated in FIGURE 2, an alternating current input voltage signal applied to the input terminals 46 and 46' is initially reflected at the collector terminal 48 of the transistor 40 and applied to the base terminal 64 of the transistor 60. Due to the emitter follower arrangement of the transistors 60 and 62, the input voltage signal is then reflected at the emitter terminal of the transistor 62 and applied to the series circuit comprising the impedance elements 32 and 34. At the impedance elements 32 and 34 the input voltage signal is either differentiated or integrated to develop an alternating current output voltage at the junction 82. The voltage at the junction 83 is either the differential or integral of the input voltage signal and is applied to the base terminal 80 of the transistor 76. Due to the emitter follower arrangement of the transistors 76 and 78 the output voltage is reflected at the emitter terminal 88 of the transistor 78 where it is applied to the output terminals 94 and 94' and to the input terminal 52 of the summing network 30 to be added with the input voltage at the junction 58. The voltage then developed at the junction 58 is equal to a sum of the input voltage and the output voltage and upon being applied to the buffer network 36 develops an output voltage at the output terminals 94 and 94' which is an exact representation of either the differential or integral of the input voltage signal.

What is claimed is:

1. A signal converter comprising:
    a summing network having first and second input terminals and an output terminal, the summing network being arranged to have a voltage gain substantially equal to unity;
    first and second impedance elements connected in series between the output terminal of the summing network and a constant voltage source, respectively, the impedance elements being a resistor and a capacitor;
    output means coupled to the series junction between the first and second impedance elements for detecting an output voltage developed across the second impedance element in response to an input voltage signal applied to the first input terminal of the summing network;
    and means for directly applying the output voltage to the second input terminal of the summing network such that a voltage equal to a sum of the input voltage and the output voltage is developed at the output terminal of the summing network.

2. A signal converter comprising:
    a summing network having first and second input terminals and an output terminal, the summing network being arranged to have a voltage gain substantially equal to unity;
    a first impedance transforming network having a high input impedance and a low output impedance, and having its input coupled to the output terminal of the summing network;
    first and second impedance elements connected in series and coupled to the output of the first impedance transforming network and a constant voltage source, respectively, the impedance elements being a resistor and a capacitor;
    means including a second impedance transforming network for applying to the second input terminal of the summing network an output voltage developed across the second impedance element in response to an input voltage signal applied to the input terminal of the summing network such that a voltage is developed at the output terminal of the summing network equal to a sum of the input voltage and the output voltage, the second impedance transforming network having a high input impedance and a low output impedance and having its input coupled to a junction of the first and second impedance elements and its output coupled to the second input terminal of the summing network; and output means coupled to the second impedance transforming network for detecting the output voltage.

3. A signal converter comprising:
    a summing network having first and second input terminals and an output terminal;
    a first transistor arranged in an emitter follower configuration with its base terminal coupled to the output terminal of the summing network;

means for biasing the first transistor to a normally conductive state;

first and second impedance elements connected in series and coupled to the emitter of the first transistor and a constant voltage source, respectively, the impedance elements being a resistor and a capacitor;

a second transistor arranged in an emitter follower configuration and having its base terminal coupled to a junction of the first and second impedance elements and its emitter terminal coupled to the second input terminal of the summing network;

means for biasing the second transistor to a normally conductive state;

and output means coupled to the emitter of the second transistor for deriving an output voltage signal in response to an input voltage signal applied to the first input terminal of the summing network.

4. The apparatus defined in claim 3 wherein the summing network includes a third transistor arranged in a grounded base configuration, and having a current amplification, $\beta$, which is substantially greater than unity, means for normally biasing the third transistor to a conductive state, a first resistor coupled between the emitter terminal of the third transistor and the first input terminal, and a second resistor coupled between the collector terminal of the third transistor and the second input terminal, the collector terminal being the output terminal of the summing network.

5. Apparatus for developing an output voltage which is a true differential of an input voltage applied thereto comprising in combination:

a first transistor arranged in a grounded base configuration and having a current amplification which is substantially greater than unity;

a first resistor coupled between the emitter terminal of the first transistor and a first input terminal for receiving an input voltage signal;

a second resistor coupled between the collector terminal of the first transistor and a second input terminal;

means for biasing the first transistor to a normally conductive state;

a second transistor arranged in an emitter follower configuration and having its base terminal coupled to the collector of the first transistor;

means for biasing the second transistor to a normally conductive state;

a capacitor coupled to the emitter of the second transistor;

a third resistor coupled between the capacitor and a constant voltage source;

a third transistor arranged in an emitter follower configuration and having its base terminal coupled to a junction of the capacitor and the third resistor and its emitter terminal coupled to the second input terminal;

means for biasing the third transistor to a normally conductive state;

and output means coupled to the emitter of the third transistor.

6. A signal converter, comprising:

first and second impedance elements connected in a series circuit, the impedance elements being a resistor and a capacitor;

a summing circuit having a pair of signal inputs and a signal output, the summing circuit producing a voltage at the output that is the arithmetic sum of the voltages applied to the two inputs;

means for applying the voltage at the output of the summing circuit across the series circuit formed by the two impedances;

and means for applying the voltage across one of the two impedances directly to one input of the summing circuit.

References Cited by the Examiner

Pages 191 and 9101, 1955—Wass: "Introduction to Electronic Analogue Computers," McGraw-Hill Book Co., Inc.

MALCOLM A. MORRISON, *Primary Examiner.*

DARYL W. COOK, *Examiner.*